United States Patent
Herzberger

(10) Patent No.: US 9,870,186 B2
(45) Date of Patent: Jan. 16, 2018

(54) MACHINE-STATE-BASED DISPLAY OF DOCUMENTATION

(71) Applicant: HEIDELBERGER DRUCKMASCHINEN AG, Heidelberg (DE)

(72) Inventor: Eckhard Herzberger, Walldorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 385 days.

(21) Appl. No.: 13/953,932

(22) Filed: Jul. 30, 2013

(65) Prior Publication Data

US 2014/0029054 A1 Jan. 30, 2014

(30) Foreign Application Priority Data

Jul. 30, 2012 (DE) .................. 10 2012 015 329

(51) Int. Cl.
| | | |
|---|---|---|
| *G06F 17/00* | (2006.01) | |
| *G06F 3/12* | (2006.01) | |
| *G06F 17/24* | (2006.01) | |

(52) U.S. Cl.
CPC .......... *G06F 3/1294* (2013.01); *G06F 3/1207* (2013.01); *G06F 3/1229* (2013.01); *G06F 3/1282* (2013.01); *G06F 3/1292* (2013.01); *G06F 17/24* (2013.01)

(58) Field of Classification Search
CPC ...... G06F 17/24; G06F 3/1294; G06F 3/1282; G06F 3/1292; G06F 3/1229; G06F 3/1207
USPC ....................................................... 715/273
See application file for complete search history.

(56) References Cited

U.S. PATENT DOCUMENTS

| | | | |
|---|---|---|---|
| 6,182,268 B1* | 1/2001 | McElvain | G06F 17/5045 716/104 |
| 6,856,985 B1* | 2/2005 | Pierce et al. | |
| 6,903,831 B1 | 6/2005 | Rapke-Kraft et al. | |
| 6,965,448 B2 | 11/2005 | Blasius | |
| 7,712,038 B2 | 5/2010 | Brand et al. | |
| 8,373,618 B2 | 2/2013 | Friedrich et al. | |
| 2002/0087578 A1* | 7/2002 | Vroman | B61L 27/0094 |
| 2002/0111924 A1* | 8/2002 | Lewis | 705/413 |

(Continued)

FOREIGN PATENT DOCUMENTS

| | | |
|---|---|---|
| DE | 19716327 A1 | 10/1998 |
| DE | 10117713 A1 | 10/2001 |

(Continued)

OTHER PUBLICATIONS

German Patent and Trademark Office Search Report dated Mar. 12, 2013.

*Primary Examiner* — Chau Nguyen
(74) *Attorney, Agent, or Firm* — Laurence A. Greenberg; Werner H. Stemer; Ralph E. Locher

(57) ABSTRACT

A method displays documentation about a machine on a preferably portable display device. The method is distinguished by the fact that the display device communicates with the machine via a data link. The portable display device communicates with the machine via a data link and the documentation contains partial items of documentation. The states of the machine are registered by a computer of the machine, and that the parts of the documentation matching the registered machine states are selected automatically and displayed on the display device.

7 Claims, 2 Drawing Sheets

(56) References Cited

U.S. PATENT DOCUMENTS

| | | | |
|---|---|---|---|
| 2002/0143505 A1* | 10/2002 | Drusinsky | G06F 17/5045 |
| | | | 703/2 |
| 2003/0058097 A1* | 3/2003 | Saltzstein et al. | 340/531 |
| 2004/0015559 A1* | 1/2004 | Goldstein | 709/217 |
| 2004/0193532 A1* | 9/2004 | Lawrence | 705/37 |
| 2005/0071538 A1* | 3/2005 | Chang et al. | 711/100 |
| 2005/0155043 A1* | 7/2005 | Schulz et al. | 719/328 |
| 2006/0200517 A1* | 9/2006 | Nelson | H04L 65/4023 |
| | | | 709/204 |
| 2006/0200550 A1* | 9/2006 | Nelson | H04L 29/06027 |
| | | | 709/224 |
| 2008/0021678 A1* | 1/2008 | Grimm et al. | 702/188 |
| 2008/0028315 A1* | 1/2008 | Kaplan | G06F 9/4446 |
| | | | 715/733 |
| 2009/0284587 A1 | 11/2009 | Berg et al. | |
| 2010/0332909 A1* | 12/2010 | Larson | G06F 11/3476 |
| | | | 714/40 |
| 2011/0219171 A1* | 9/2011 | Kuehne | G06F 12/00 |
| | | | 711/103 |
| 2012/0042036 A1* | 2/2012 | Lau et al. | 709/217 |

FOREIGN PATENT DOCUMENTS

| | | | |
|---|---|---|---|
| DE | 102004049695 A1 | 4/2006 | |
| DE | 102006022204 A1 | 12/2007 | |
| DE | 102007025796 A1 | 12/2008 | |
| DE | 102009018477 A1 | 11/2009 | |
| DE | EP 2397913 A1 * | 12/2011 | G03G 15/55 |
| WO | 0052541 A1 | 9/2000 | |

* cited by examiner

MACHINE-STATE-BASED DISPLAY OF DOCUMENTATION

CROSS-REFERENCE TO RELATED APPLICATION

This application claims the priority, under 35 U.S.C. § 119, of German application DE 10 2012 015 329.5, filed Jul. 30, 2012; the prior application is herewith incorporated by reference in its entirety.

BACKGROUND OF THE INVENTION

Field of the Invention

The present invention relates to a method for displaying documentation about a machine on a preferably portable display device.

Complex plants and machines such as printing presses are complicated to operate merely on account of the many possible settings. In order to make the operation easier, help functions are integrated in control software and, when problems occur or in the event of malfunctions, give appropriate help on a monitor screen. This help is usually given in the form of images, text or videos. U.S. Pat. No. 7,712,038 discloses an apparatus and a method for finding and displaying information about a machine. To this end, software is provided which makes it easier for the operator to find specific parts in the printing press on monitor screens. Appropriate information relating to the found parts of the machine is then displayed. Thus, by using a search window on the monitor screen, the operator can move over the machine and arrange for the components covered by the search window, together with associated information, to be displayed. This is particularly helpful when spare parts have to be replaced in the machine.

U.S. Pat. No. 6,903,831 discloses an operating system for a printing press having a graphic user interface which has electronic documentation, which can be displayed on the operator interface on the basis of operating inputs from the operator. The electronic documentation contains operating instructions, a spare parts catalog and maintenance instructions. The operating system also contains a list which produces links between electronic addresses of parts in the printing press and spare parts numbers or spare parts drawings in an electronic catalog. In this way, in the event of detection of a failure of a component, by using the electronic address of the latter, the appropriate component can immediately be displayed to the operator, so that the operator knows which component must be replaced. Furthermore, a method which permits automatic updating of the electronic operating system is described in the patent.

However, the aforementioned methods of making the operation easier have the disadvantage that the hints and helpful instructions are defined and not flexible.

BRIEF SUMMARY OF THE INVENTION

It is therefore an object of the invention to devise a method for displaying documentation about a machine on a preferably portable display device, which displays only the currently relevant parts of documentation to the operator in a comprehensible form.

The method according to the invention is suitable for displaying documentation about complex machines and plants. As a result, it is intended to make the operation of printing presses, folders, gatherer-stitchers and similarly complex machines in the graphics industry easier. The method according to the invention needs a display device having a monitor screen in order to be able to display the necessary documentation. The display device itself communicates with the machine via a data link, so that states of the machine can also be taken into account when displaying the documentation. Furthermore, the electronic documentation contains a number of parts of the documentation, suitable machine states being allocated to the parts of the documentation. Furthermore, the machine has a computer which registers the states of the machine and passes the states on to the display device via the data link. On account of the association between states of the machine and parts of the documentation, when a specific machine state occurs the matching parts of the documentation can then be selected automatically and displayed on the display device. This has the great advantage that, for example, it is not necessary for all the documentation associated with a component to be displayed but only the documentation relevant to the respectively registered machine state. For instance, if a fault occurs in the air supply system in the feeder of a printing press, then, on the basis of this state of the machine, it is not all of the documentation for the feeder that is displayed but only the part of the documentation which relates to the air supply of the feeder. In this way, the operator of the machine is given a better overview of the relevant parts of the machine. This is in particular also helpful to service personnel who have to maintain such a complex machine. In this case too, only the part of the documentation that is relevant to the current machine state is displayed to the service personnel. This advantageous method for displaying documentation is substantially based on the fact that machine states are registered and these machine states are linked with parts of the documentation.

In a first refinement of the invention, provision is made for the documentation to be stored on the display device or in a documentation memory connected via the data link. In the first case, the documentation is located in the memory of the display device or a computer assigned to the display device, and the machine states are supplied to the display device by the machine via the communication link. In the second case, the documentation is stored externally in a documentation memory outside the display device, wherein the machine states are then fed to the display device and the display device requests the suitable part of the documentation from the documentation memory on the basis of the machine states supplied. It is also possible for the machine states and the suitable part of the documentation to be combined by the computer of the machine or another computer and for the parts of the documentation determined in this way then to be transferred to the display device.

In a particularly advantageous refinement of the invention, provision is made for the documentation to be a video film and for the documentation to have a number of video clips. In particular in the case of video films for support during the operation and maintenance of a machine, there is the problem of finding the correct part of the film or the correct images from the film which deal just with the current problem of the machine. Here, it is of inestimable value if, on the basis of the machine states transmitted, the suitable parts of the video film can be selected immediately, so that the operator is presented with just that part of the video film which he actually needs to see. In this way, the operator does not have to look for the suitable section of the video film via fast forward, rewind or slow motion; the suitable video clip is instead displayed to him automatically. If the documentation is not located on the display device but in a separate documentation memory, the transmission of data can additionally be reduced substantially in this way, since only the video clip actually needed then has to be transferred to the display device as part of the video film and not the entire video film. Since video films always have a comparatively high data volume, this relieves the load on the data link between the machine, the documentation memory and the display device substantially.

Furthermore, provision is made for the display device to be a monitor screen, a touch screen, a laptop, a smart phone or a tablet computer. In particular when assisting service personnel, a portable display device is frequently used. Suitable for this purpose are laptop, smart phone or tablet computer, wherein here, too, the documentation can be stored either on the portable display device or in a documentation memory connected via the data link. The data link between the display device and the machine and also the documentation memory is a network link, such as Ethernet. In the case of a wire-bound network link, besides Ethernet, USB, LAN or CAN bus links are also suitable. In the case of portable display devices, the network link is advantageously implemented in a wire-free manner as a WLAN, Bluetooth or mobile radio link, so that the operator can move freely around the machine with his portable display device.

Advantageously, provision is made for reproduction software to be installed on the display device, which selects the suitable parts of the documentation by using the machine states transmitted by the computer of the machine. This reproduction software can be, for example, what is known as a Flash Player, which is suitable for reproducing highly compressed video films in the streaming process. This reproduction software is then fed only the suitable parts of the documentation by using the machine states transmitted by the computer of the machine, so that, for example, only the necessary video clip is displayed by the reproduction software. This is done in particular by using what are known as servlets. In this case, the machine states registered are respectively transmitted to a servlet on the computer of the machine, each item of documentation being assigned a servlet. A suitable server is installed on the computer of the machine itself. Before the reproduction of the documentation by the reproduction software on the display device, the machine state is then interrogated in the associated servlet and thus the suitable part of the documentation is selected automatically. As soon as, for example, the "play key" of the reproduction software is actuated, the respective servlet is interrogated in accordance with the current machine state. Depending on the machine state transmitted by the computer of the machine, the matching part of the documentation is then started in the form of a Flash video clip.

In a further refinement of the invention, provision is made that, by the display device, setting procedures can be carried out on the machine and that these setting procedures are transferred to the computer of the machine via the data link. In this way, the operator can convert the helpful instructions and information transmitted on the display device immediately into corresponding setting procedures and manage these setting procedures directly on the display device, for example by appropriate settings being made via a touch-screen interface of the display device.

Other features which are considered as characteristic for the invention are set forth in the appended claims.

Although the invention is illustrated and described herein as embodied in a machine-state-based display of documentation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
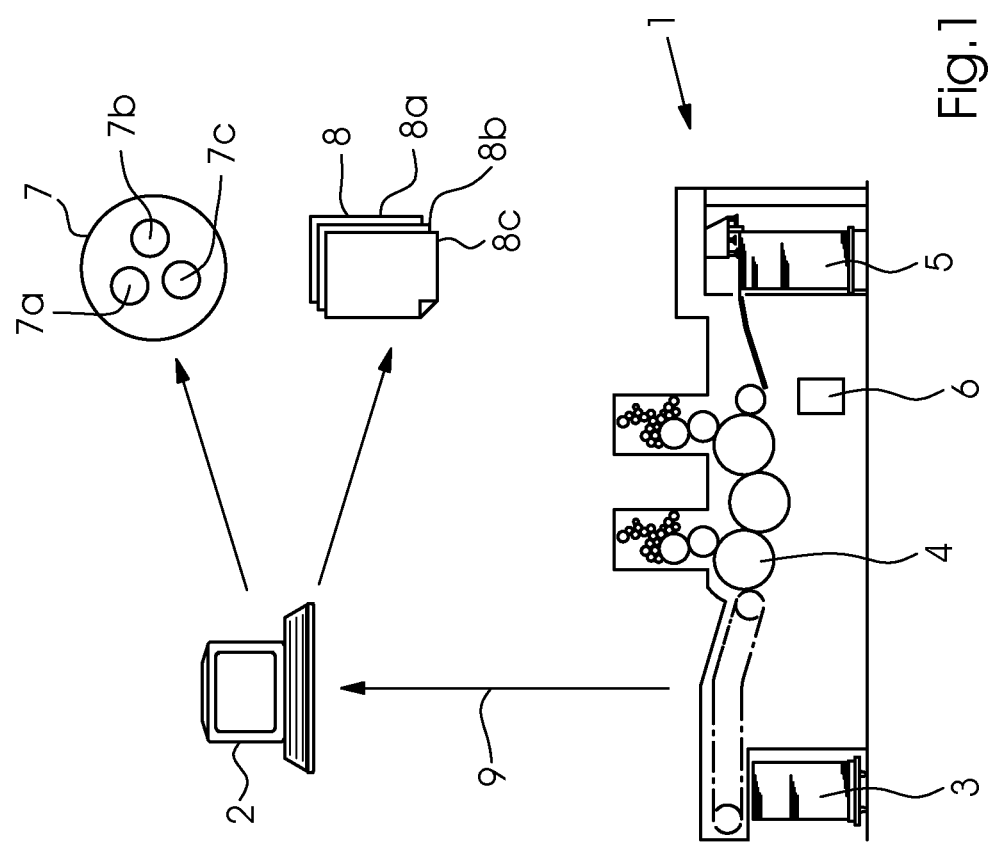
FIG. 1 is an illustration showing a printing press which is connected in a wire-free manner to a service laptop, on which video films are stored as documentation according to the invention.

Referring now to the figures of the drawing in detail and first, particularly, to FIG. 1 thereof, there is shown a sheet-fed printing press 1 having a feeder 5, a number of printing units 4 and a deliverer 3 depicted by way of example. All the components of the printing press 1 are controlled via a machine computer 6. The machine computer 6 registers the states of the respective drives and actuating elements in the printing press 1 via sensors and stores the states. Furthermore, via a wire-free network link 9, the machine computer 6 is connected to a service laptop 2, which assists maintenance personnel when carrying out maintenance work. Stored on the service laptop 2 is documentation 8 about the printing press 1, containing a number of partial items of documentation 8a, 8b, 8c. In addition to the documents belonging to the documentation 8, there is further documentation which contains a video film 7. The video film 7 contains a number of video clips 7a, 7b, 7c. If a problem occurs on the printing press 1, the problem is registered as a machine state by the machine computer 6 and transmitted to the service laptop 2 via the network link 9. By using the machine state, software on the service laptop 2 then selects the suitable video clip 7a, 7b, 7c and/or the suitable part of the documentation 8a, 8b, 8c, so that the operator is not displayed all of the documentation 8 or the entire video film 7 but only the suitable part of the documentation for the problem or the suitable video clip.

Figure 2:
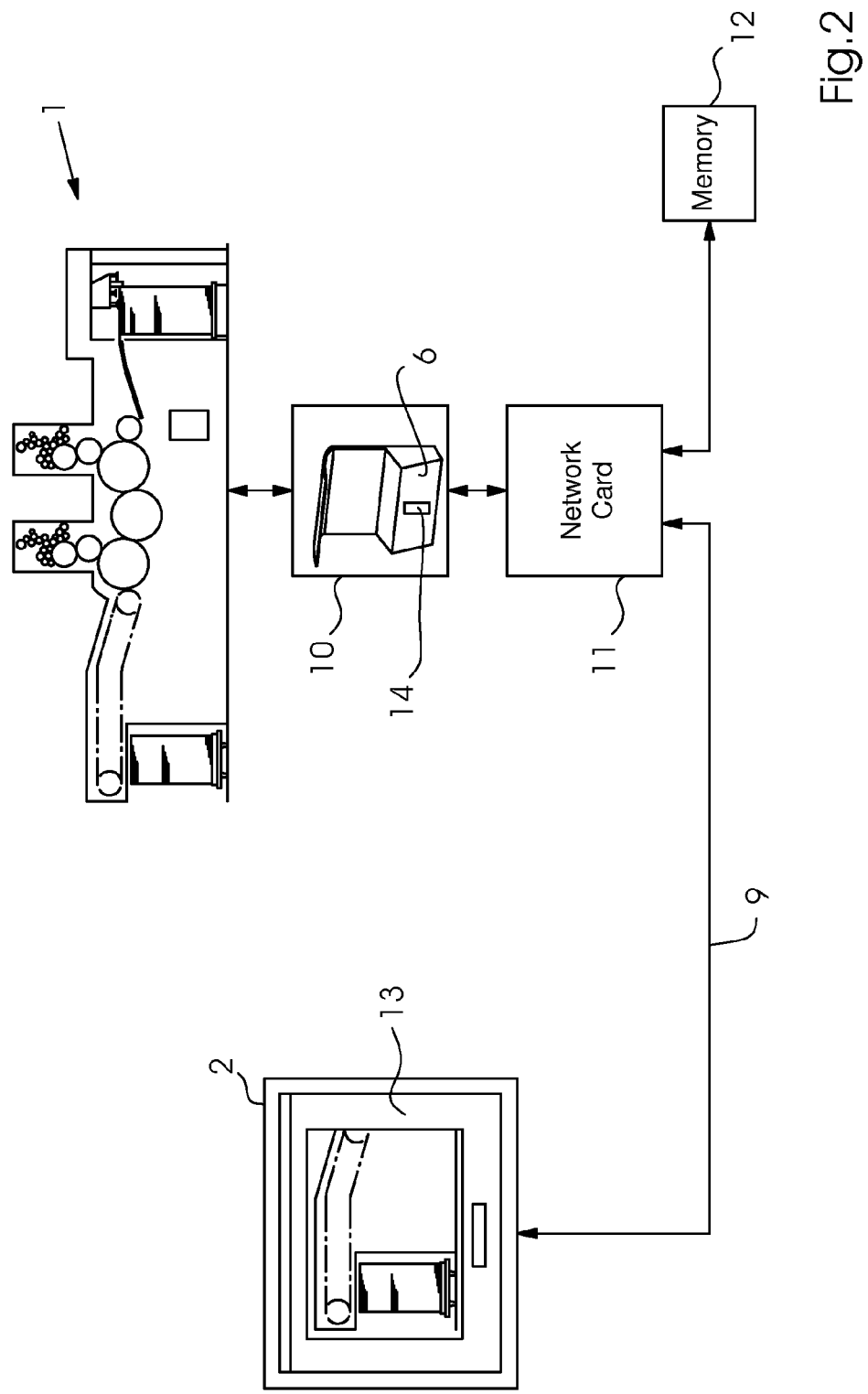
FIG. 2 is an illustration showing a selection process of a suitable video clip on a basis of a current machine state.

The selection of the suitable parts of the documentation 8a, 8b, 8c or of the suitable video clip 7a, 7b, 7c is illustrated in more detail in FIG. 2. It can be seen that the machine computer 6 of the printing press 1 is accommodated in a control desk 10 of the printing press 1. The control desk 10 of the printing press 1 substantially contains a PC and has a network card 11, via which wire-bound and wire-free network links 9 can be set up. In FIG. 2, the documentation 8 and the video film 7 are stored externally in a documentation memory 12. This has the advantage that not every display device 2 has to have the documentation 8 or the video film 7; instead that suitable documentation from the documentation memory 12 can be loaded at any time onto each connected display device. On the machine computer 6, there is installed a server and also suitable servlets 14, which are assigned to corresponding components of the printing press 1. In the servlet 14, the state of the associated component or subassembly, detected by the machine computer 6, is respectively stored. In this way, the respectively current machine states are always stored in the servlets 14. The servlets 14 can be reached at any time by the service laptop 2 via the network card 11 and the network link 9. If playing software in the form of a Flash Player 13 is started on the service laptop 2 in order to play the video film 7, then the servlet 14 assigned to the video film 7 is interrogated on the machine computer 6 in the control desk 10 in accordance with the stored machine state. The machine state is then transferred into the service laptop 2, which in turn selects the video clip 7a, 7b, 7c matching the machine state of the servlet 14 in the documentation memory 12. The selected video clip 7a, 7b, 7c is then transferred into the service laptop 2 via the network link 9 and played in the Flash Player 13. In this way, the operator or the service personnel is/are always displayed just the part of the documentation 8 or the video film 7 which belongs to the current problem. Thus, operator and maintenance personnel are assisted in a pinpointed manner during the rectification of the problems.

The invention claimed is:

1. A method for displaying documentation about a printing press on a display device, which comprises the steps of:
 installing reproduction software on the display device;
 configuring the documentation to contain operating instructions, a spare parts catalog, maintenance instructions and video film having a number of video clips;
 communicating, via the display device being a portable display device, with the printing press via a data link, the documentation being subdivided into partial items of documentation;
 registering states of the printing press by means of a computer of the printing press resulting in registered machine states, wherein suitable machine states are allocated to the partial items of the documentation;
 selecting automatically the partial items of documentation matching the registered machine states via the reproduction software selecting suitable parts of the documentation by using the registered machine states transmitted by the computer of the printing press;
 transmitting the registered machine states to servlets on the computer, and each of the partial items of documentation is assigned one of the servlets, and before the documentation is played by the reproduction software, a respective one of the registered machine states is interrogated in the servlet and thus a suitable part of the documentation is selected automatically; and
 displaying the partial items of documentation on the display device.

2. The method according to claim 1, which further comprises performing one of:
 storing the documentation on the display device; or
 storing the documentation in a documentation memory connected via the data link to the display device.

3. The method according to claim 2, which further comprises providing a network link as the data link between the display device, the printing press and the documentation memory.

4. The method according to claim 3, which further comprises selecting the network link from the group consisting of a wire-free network link, a WLAN, a wireless data transfer network link and a mobile radio link.

5. The method according to claim 3, which further comprises selecting the network link from the group consisting of a wire-bound manner network link, a USB, LAN bus link and a CAN bus link.

6. The method according to claim 1, which further comprises selecting the display device from the group consisting of a monitor screen, a touch screen, a laptop, a smart phone and a tablet computer.

7. The method according to claim 1, wherein by means of the display device, setting procedures are carried out on the printing press and the setting procedures are transferred to the computer of the printing press via the data link.

* * * * *